June 26, 1951 W. B. ATKINSON 2,557,928

ELECTRICAL APPARATUS HAVING SILICONE RUBBER INSULATION

Filed Dec. 15, 1945

WITNESSES:

INVENTOR

William B. Atkinson.

BY

ATTORNEY

Patented June 26, 1951

2,557,928

UNITED STATES PATENT OFFICE 2,557,928

ELECTRICAL APPARATUS HAVING SILICONE RUBBER INSULATION

William B. Atkinson, Pittsburgh, Pa., assignor to Westinghouse Electric Corporation, East Pittsburgh, Pa., a corporation of Pennsylvania Application December 15, 1945, Serial No. 635,351

9 Claims. (Cl. 174—18)

This invention relates to means for providing liquid-tight sealing of casings containing liquid dielectrics and, in particular, relates to gaskets that are inert to the action of conventional liquid dielectrics.

In order to assure the proper functioning of electrical apparatus immersed in a liquid dielectric, it has been a problem to maintain a liquid-tight casing thereof. The industry has been searching for a suitable gasket material capable of withstanding the dissolving and swelling action of such liquid dielectrics as petroleum oils and halogenated cyclic organic compounds, but with only moderate success. The combination of elevated temperatures and a continual circulation of the fluid dielectric enhances the reactivity of halogenated cyclic organic compounds with practically all known elastomeric materials available to the trade. Continual inspection and maintenance are required at the present time to maintain the integrity of casings of electrical apparatus, even with the best available gasket compositions known to the trade.

It has been discovered that certain elastomeric organic silicon oxide polymers are remarkably inert to many hydrocarbon oils and halogenated cyclic organic compounds. This property is quite surprising, since polymers of organic silicon oxides are quite soluble, or swell extensively, when immersed in carbon tetrachloride, chloroform, benzene, toluene, and similar organic fluids. Usually, contact with these latter fluids causes such degradation of the polymer that the material is unfit for use after a short contact. Therefore, it is extremely unexpected that such compounds as chlorinated diphenyl, trichlorbenzene, and paraffinic petroleum fractions have no observable or significant swelling or dissolving action on elastomeric organic silicon oxide polymers. A strip of the elastomeric organic silicon oxide polymer, commonly known as silicone rubber, may be immersed in chlorinated diphenyl dielectric liquid at a temperature of 135° C. for several weeks without any appreciable effect thereon.

The object of this invention is to provide a sealed casing containing a liquid dielectric in which the joints of the casing are sealed by the application of a gasket composed of an elastomeric organic silicon oxide polymer.

A further object of the invention is to provide a gasket material suitable for use in contact with halogenated cyclic organic compounds and petroleum oils.

Other objects of the invention will, in part, be obvious and will, in part, appear hereinafter. For a fuller understanding of the nature and objects of the invention, reference should be had to the following detailed description and drawing, in which.

Figure 1:
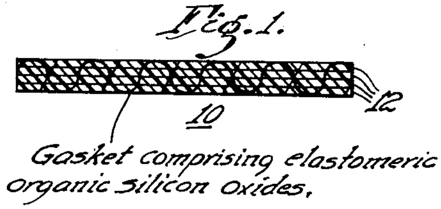
Figure 1 is a cross-section through a gasket composed of a plurality of bonded layers of fibrous material.

Referring to Fig. 1 of the drawing, there is illustrated a cross-section of a gasket 10 composed of a plurality of layers of fibrous material 12, such, for example, as asbestos cloth, asbestos paper, glass fiber cloth, glass mat, cotton duck, paper, or the like, impregnated with, and united by, an elastomeric organic silicon oxide polymer.

For use in the process described with reference to Fig. 1, the elastomeric silicon oxide polymer is prepared from a fluid organo-silicon oxide intermediate polymer having the general formula:

$$\left[\begin{array}{c} R_1 \\ | \\ \text{Si}-\text{O}- \\ | \\ R_2 \end{array}\right]_x$$

where X may have a numerical value of from 3 to 1000 or more, and $R_1$ and $R_2$ may be the same or different aliphatic radicals. It has been found that excellent results are obtained when $R_1$ and $R_2$ are methyl groups. However, $R_1$ and $R_2$ may be ethyl, propyl, butyl, allyl, methallyl, chloroethyl, fluoromethyl, and the like. The unsaturated groups, such as allyl, are preferably a minor proportion of the total. If allyl groups are present, sulphur may be employed as a vulcanizing agent. The ratio of the aliphatic radicals to silicon may be from 1.9 to 2.2, preferably about 2. The polymer having the general formula $$\left[\begin{array}{c} R_1 \\ | \\ \text{Si}-\text{O}- \\ | \\ R_2 \end{array}\right]_x$$

should have a viscosity of from 10 to 5000 centistokes, and preferably in the range of from 100 to 1000 centistokes for convenience in handling. The polymeric molecules may have terminal groups with either three aliphatic radicals attached to silicon, such as

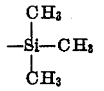

or with a hydroxyl radical and two aliphatic radicals attached to the silicon atom, thus

The fluid polymer is admixed with from about 5% to 15% of the weight thereof of a catalyst for promoting oxidation type of polymerization. Suitable catalysts for this purpose are benzoyl peroxide and tert. butyl peroxide. Likewise a small amount of sulfur may be added if allyl groups are present.

The fluid polymer with the catalyst therein is combined with a sufficient amount of a finely divided, relatively inert inorganic solid to provide from 30% to 70% of the weight of the whole. Examples of suitable inorganic solids are calcium carbonate, titanium dioxide, lithopone, barium sulphate, iron oxide, mica, and silica. It is preferred that the inorganic materials be of a fineness of less than 325 mesh. However, satisfactory results are secured if the inorganic solids are somewhat coarser, though better resiliency and other properties are obtained if a substantial amount of the inorganic solid is as fine as 500 mesh or finer.

The fluid polymer having the formula

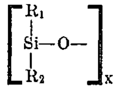

the polymerizing catalyst, and finely-divided inorganic solids are thoroughly admixed to a smooth paste. The paste mixture may be readily applied to, or combined with, fibrous materials by calendering, spreading with a doctor blade, mixing in a mill, or the like. Thereafter, the composite material is put in a press, where it may be maintained under moderate pressures at a temperature of from about 170° C. to 230° C. and higher, for a period of time of from about 12 to 1 hours, the shorter times being sufficient at the higher temperature. A reaction cross-linking the intermediate organo-silicon oxide molecules occurs to produce an elastomeric organic silicon oxide polymer having excellent resiliency. Further, after curing of the elastomer may be accomplished by heating in an oven in a temperature range of from 150° C. to 250° C. without the use of pressure may be carried out in order to assure a completion of the reaction.

It will be appreciated that, if the fibrous material 12 is left out, the elastomeric product produced will be relatively soft depending on the amount of inorganic solids added and suitable only for gasket material that is not to be subjected to heavy pressures. Such soft material, however, is useful where a large degree of deformation is necessary in order to accommodate untrue or rough surfaces. By combining a suitable proportion of fibrous material with the elastomeric polymer, and by employing selected pressures, gaskets having any desired degree of hardness or resiliency within a wide range may be secured. For machined surfaces, and where high pressures may be applied, the gaskets may be prepared with a large proportion of tightly-woven asbestos or glass fiber cloth combined with the elastomeric silicon oxide polymer under considerable pressure of several hundred pounds per square inch. A gasket of this type will be particularly useful for sealing electrical apparatus maintained under considerable pressure.

Figure 2:
Fig. 2 is a cross-section through a gasket composed of pulverized cork bonded with an elastomeric organic silicon oxide polymer.

Gaskets may be prepared with cork granules or powder embodied in the elastomeric organic silicon oxide polymers, as illustrated at 14 in Fig. 2 of the drawing. The pulverized granulated cork may be kneaded in the mixture of intermediate organic silicon polymer having the unit formula

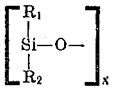

benzoyl peroxide catalyst and finely-divided inorganic solids. The composition may be spread into layers of any desired thickness and molded under heat and pressure. A completely closed mold may be employed and the cork containing mixture converted into a large block or slab. The block or slab thereafter may be shaved, sliced, or otherwise cut into sheets of required thickness for gasket applications.

It will be appreciated that the gaskets of this invention need not necessarily be of uniform thickness, but may be molded to any predetermined shape or size, to suit the requirements of the application. The composition may be molded into large blocks which may be cut or machined into three dimensional structures meeting the demands of the particular job.

The compositions 10 and 14 of Figs. 1 and 2 may be cut or punched in conventional types of gasket punching machines to provide suitable apertures and passageways for bolts and other members therethrough.

Figures 3, 4:
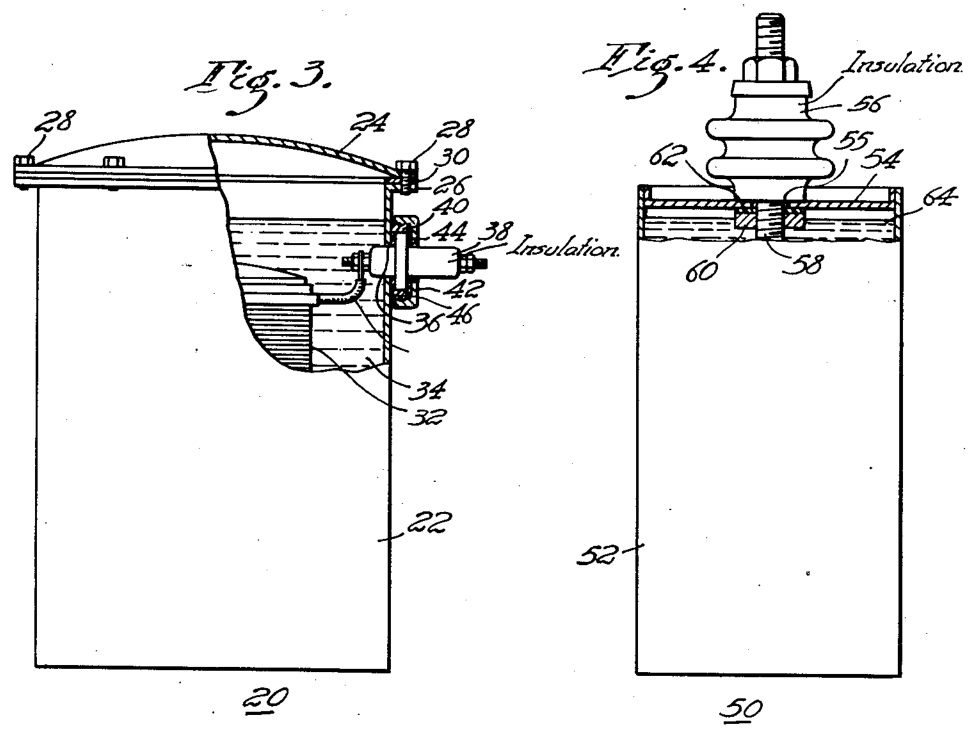
Fig. 3 is a view, in elevation, partly in section, of a transformer.
Fig. 4 is a view, in elevation, partly in section, of a capacitor.

For an application of the gasket compositions of this invention to a transformer, reference should be had to the transformer 20 of Fig. 3 of the drawing. The transformer 20 comprises a jointed sealed casing 22 provided with a cover 24 attached to the flange 26 by means of bolts 28, or other suitable fastening means. The gasket 30 interposed between the cover 24 and the flange 26 may be composed of the compositions 10 or 14, or of the elastomeric silicon oxide polymer alone.

Within the casing 22 is disposed an electrical member 32 composed of electrical conductors, the casing being filled with a fluid dielectric 34 to both insulate and cool the member 32. The side wall of the casing 22 is provided with an aperture 36 for the passage of an electrical conductor in the form of a porcelain bushing 38. The casing is provided with a screw-threaded boss 40 for cooperating with a screw-threaded flange fitting 42 for retaining the bushing 38 in position. Gaskets 44 and 46 between the screw-threaded fitting 42, the bushing 38, and the casing 22 provide for a liquid-tight and resilient closure of the aperture 36.

The liquid dielectric 34 in the casing, providing for both the cooling and insulation of the electrical members 32 and bushing 38, may be, and preferably is, selected from the group consisting of certain refined petroleum oils and halogenated cyclic organic compounds such, for example, as decachlorodiphenyl, trichlorobenzene and chlorinated diphenyl oxide. These dielectric liquids will be without any deleterious effects on the gaskets 30, 44 and 46, regardless of the temperature of the liquid dielectric 34, due to the relatively inert nature of the elastomeric organic silicon oxides employed in the gaskets. After immersion for 30 days in chlorinated diphenyl at a temperature of 135° C. the net change in volume was 0.2%. In a refined petroleum transformer oil, the elastomer swelled less than did chloroprene after 30 days at 135° C. The gaskets furthermore are unusually inert to the action of gases in the atmosphere, moisture, ultra-violet light, oils, and other substances or influences that may be expected in normal use of a transformer. Thus after 30 days' exposure to the atmosphere at 135° C. the volume had decreased about 2%. Therefore, the gasket material will be satisfactory for the life of the apparatus.

In view of the unexpected discovery that the elastomeric silicon oxide polymers will not be affected by the usual liquid dielectrics, it may be desirable to apply the composition to conductors as insulation, as shown at 46 in the drawing. Spacers, separators, and other electrically insulating members may be prepared from the composition and applied to the electrical member 32, whereby effective insulation will be attained without adverse effects from the liquid dielectric 34. Such spacers should be effective as cushioning means as well.

Referring to Fig. 4 of the drawing, there is illustrated a capacitor 50 comprising a casing 52 with a cover 54 sealed thereto by soldering, welding, or the like. The cover 54 is provided with an aperture 55 for passage therethrough of the electrical conductor 58 associated with the bushing 56. The electrical conductor 58 is screw-threaded to allow travel of a threaded nut 60 thereon. A gasket 62, composed of the elastomeric organic silicon oxide material, such as 10 or 14 of Figs. 1 and 2, is interposed between the nut 60 and the cover 54 to provide for a liquid-tight seal and for eletcrical insulation between the conductor and the casing. The gasket 62 will be found effective for the life of the capacitor 50, whether the liquid dielectric 64 therein is a petroleum oil, a halogenated cyclic organic compound, or other conventional capacitor fluid, due to the relative inertness of the elastomer to such liquids.

Figure 5:
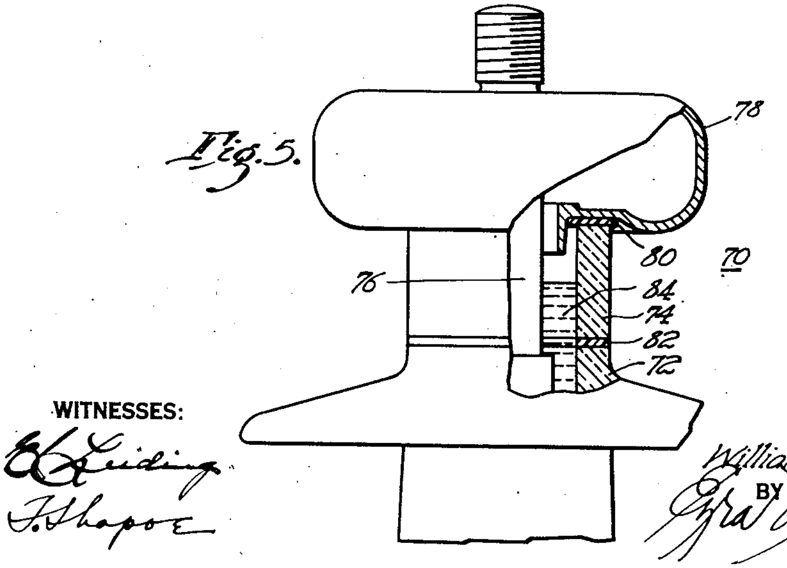
Fig. 5 is a fragmentary view, in elevation, partly in section, of a bushing.

In Fig. 5 of the drawing, the bushing 70 is composed of a hollow tubular porcelain member 72 for carrying a liquid dielectric 84, joined to a glass cylinder 74 to enable inspection of the fluid level within the bushing. The conductor 76 is provided with a resilient terminal cap 78 for maintaining pressure upon the porcelain member 72 and glass cylinder 74. A gasket 80 composed of the elastomeric organic silicon oxide polymers, alone or combined with fibrous or other resilient materials, is applied between the cap 78 and the glass cylinder 74 in order to maintain a liquid-tight seal and to prevent physical damage to the glass. The joint between the porcelain 72 and glass 74 may also be maintained fluid-tight by the application of a suitable gasket 82 composed of the elastomeric silicon oxide compositions disclosed herein. The gaskets 80 and 82 will be found to be completely unaffected by the liquid dielectric 84, such as oil or halogenated cyclic organic compounds commonly employed in bushings.

Where the gaskets are to be subjected to extremely high temperatures for prolonged periods of time in contact with oxygen, it may be desirable to apply thereto an anti-oxidant to prevent hardening and deterioration of the elastomer. Suitable anti-oxidants are metal chelates, such as chromium or copper acetylacetonate, a phenol, such as beta-naphthyl salicylate, or an arylamine, such as alpha naphthylamine. A convenient way of incorporating the anti-oxidant is to dissolve the anti-oxidant in benzene, toluene or other solvent capable of swelling the elastomer, and to dip, or immerse, the gasket, such as 10 or 14, in the solution for a brief period of time. The benzene solution will cause swelling of at least the surface layers of the gasket and will carry the anti-oxidant into the elastomer. Upon removal of the gasket from the solution and drying, the solvent will evaporate and the anti-oxidant will be left within the elastomer. The elastomer will return to its normal condition without any marked loss in physical strength or other properties. The anti-oxidants need be applied in an amount of the order of one-tenth of one percent by weight to impart a greatly improved resistance to oxidation, though larger amounts give increasing benefits.

Numerous other devices than those specifically described, employing or handling, petroleum oils and halogenated cyclic organic compounds, may be provided with gaskets, supports, diaphragms or other parts, composed of the elastomeric silicon oxide polymers. Switches, cables, regulators, pumps, valves, and numerous other devices may be rendered more satisfactory for use by employing the elastomeric organic silicon oxide polymers as flexible portions thereof.

Since certain obvious changes may be made in the above processes, and different embodiments of the invention could be made without departing from the scope thereof, it is intended that all material contained in the above description or taken in connection with the accompanying drawing shall be interpreted as illustrative and not in a limiting sense.

I claim as my invention:

1. Electrical apparatus comprising, in combination, a casing having an aperture therein for passage of an electrical conductor, an electrical conductor passing through the aperture, a liquid dielectric consisting of chlorinated cyclic organic compounds disposed in the casing, aperture closing means associated with the electrical conductor to provide for sealing the casing, and a gasket cooperating with the aperture closing means to assure a liquid-tight closure of the aperture, the gasket comprising as its essential component an elastomer derived by reacting at a temperature of from about 170° C. to 230° C. and higher for about 12 to 1 hours the fluid polymer having the general formula $$\left[\begin{array}{c} R_1 \\ | \\ \mathrm{Si}-\mathrm{O}- \\ | \\ R_2 \end{array}\right]_x$$

where $R_1$ and $R_2$ represent aliphatic radicals, the viscosity of the fluid polymer being from 10 to 5000 centistokes, in the presence of from about 5% to 15% of the weight thereof of a catalyst for promoting oxidation type of polymerization and sufficient of a finely-divided, relatively inert inorganic solid to provide for from 30% to 70% of the weight of the elastomer.

2. Electric?l apparatus comprising, in combination, a casing having an aperture therein for passage of an electrical conductor, a liquid dielectric consisting of halogenated cyclic organic compounds disposed in the casing, aperture closing means associated with the electrical conductor to provide for sealing the casing, and a gasket cooperating with the aperture closing means to assure a liquid-tight closure of the aperture, the gasket comprising as its essential component an elastomer derived by reacting at a temperature of from about 170° C. to 230° C. and higher for about 12 to 1 hours the fluid polymer having the general formula $$\left[\begin{matrix} R_1 \\ | \\ Si-O- \\ | \\ R_2 \end{matrix}\right]_x$$

where $R_1$ and $R_2$ represent aliphatic radicals, the viscosity of the fluid polymer being from 10 to 5000 centistokes, in the presence of from about 5% to 15% of the weight thereof of a catalyst for promoting oxidation type of polymerization and sufficient of a finely-divided, relatively inert inorganic solid to provide for from 30% to 70% of the weight of the elastomer, and a fibrous material combined with the elastomer to impart mechanical strength to the gasket.

3. Electrical apparatus comprising, in combination, a casing having an aperture therein for passage of an electrical conductor, a liquid dielectric consisting of halogenated cyclic organic compounds disposed in the casing, aperture closing means associated with the electrical conductor to provide for sealing the casing, and a gasket cooperating with the aperture closing means to assure a liquid-tight closure of the aperture, the gasket comprising as its essential component an elastomer derived by reacting at a temperature of from about 170° C. to 230° C. and higher for about 12 to 1 hours the fluid polymer having the general formula $$\left[\begin{matrix} R_1 \\ | \\ Si-O- \\ | \\ R_2 \end{matrix}\right]_x$$

where $R_1$ and $R_2$ represent aliphatic radicals, the viscosity of the fluid polymer being from 10 to 5000 centistokes, in the presence of from about 5% to 15% of the weight thereof of a catalyst for promoting oxidation type of polymerization and sufficient of a finely-divided, relatively inert inorganic solid to provide for from 30% to 70% of the weight of the elastomer, and sheets of asbestos cloth combined with the elastomer.

4. Electrical apparatus comprising, in combination, a casing having an aperture therein for passage of an electrical conductor, a liquid dielectric consisting of halogenated cyclic organic compounds disposed in the casing, aperture closing means associated with the electrical conductor to provide for sealing the casing, and a gasket cooperating with the aperture closing means to assure a liquid-tight closure of the aperture, the gasket comprising as its essential component an elastomer derived by reacting at a temperature of from about 170° C. to 230° C. and higher for about 12 to 1 hours the fluid polymer having the general formula $$\left[\begin{matrix} R_1 \\ | \\ Si-O- \\ | \\ R_2 \end{matrix}\right]_x$$

where $R_1$ and $R_2$ represent aliphatic radicals, the viscosity of the fluid polymer being from 10 to 5000 centistokes, in the presence of from about 5% to 15% of the weight thereof of a catalyst for promoting oxidation type of polymerization and sufficient of a finely-divided, relatively inert inorganic solid to provide for from 30% to 70% of the weight of the elastomer, and pulverized cork combined with the elastomer.

5. Electrical apparatus comprising, in combination, a casing having an aperture therein, a liquid dielectric consisting of halogenated cyclic organic compounds disposed in the casing, aperture closing means associated with the aperture to provied for sealing the casing, and a gasket cooperating with the aperture closing means to assure a liquid-tight closure of the aperture, the gasket comprising as its essential component an elastomer derived by reacting at a temperature of from about 170° C. to 230° C. and higher for about 12 to 1 hours the fluid polymer having the general formula $$\left[\begin{matrix} R_1 \\ | \\ Si-O- \\ | \\ R_2 \end{matrix}\right]_x$$

where $R_1$ and $R_2$ represent aliphatic radicals, the viscosity of the fluid polymer being from 10 to 5000 centistokes, in the presence of from about 5% to 15% of the weight thereof of a catalyst for promoting oxidation type of polymerization and sufficient of a finely-divided relatively inert inorganic solid to provide for from 30% to 70% of the weight of the elastomer.

6. Electrical apparatus comprising, in combination, a casing having an aperture therein, a liquid dielectric consisting of halogenated cyclic organic compounds disposed in the casing, aperture closing means associated with the aperture to provide for sealing the casing, and a gasket cooperating with the aperture closing means to assure a liquid-tight closure of the aperture, the gasket comprising as its essential component an elastomer derived by reacting at a temperature of from about 170° C. to 230° C. and higher for about 12 to 1 hours the fluid polymer having the general formula $$\left[\begin{matrix} R_1 \\ | \\ Si-O- \\ | \\ R_2 \end{matrix}\right]_x$$

where $R_1$ and $R_2$ represent aliphatic radicals, the viscosity of the fluid polymer being from 10 to 5000 centistokes, in the presence of from about 5% to 15% of the weight thereof of a catalyst for promoting oxidation type of polymerization and sufficient of a finely-divided relatively inert inorganic solid to provide for from 30% to 70% of the weight of the elastomer, and an antioxidant distributed in at least the surface layers of the elastomer.

7. Electrical apparatus comprising, in combination, an electrical member, a liquid dielectric applied to the member, the dielectric liquid consisting of halogenated cyclic organic compounds, and electrically insulating means associated with the electrical member and subject to the action of the liquid dielectric, the insulating means comprising as its essential component an elastomer derived by reacting at a temperature of from about 170° C. to 230° C. and higher for about 12 to 1 hours the fluid polymer having the general formula $$\left[\begin{matrix} R_1 \\ | \\ Si-O- \\ | \\ R_2 \end{matrix}\right]_x$$

where $R_1$ and $R_2$ represent aliphatic radicals, the viscosity of the fluid polymer being from 10 to 5000 centistokes, in the presence of from about 5% to 15% of the weight thereof of a catalyst for promoting oxidation type of polymerization and sufficient of a finely-divided relatively inert inorganic solid to provide for from 30% to 70% of the weight of the elastomer.

8. A capacitor comprising, in combination, a sealed casing, electrical capacitor elements disposed within the casing, a liquid dielectric comprising chlorinated cyclic hydrocarbons disposed in the casing and immersing the electrical capacitor elements, the casing having an aperture, an electrical conductor connected to the electrical capacitor elements and extending through the aperture to the exterior of the casing, sealing means applied to the conductor at the aperture to seal the aperture, and to position and electrically insulate the conductor from the casing, the sealing means including a gasket member impervious and inert to the chlorinated cyclic hydrocarbons, the gasket member comprising a cured dimethyl silicone elastomer.

9. A capacitor comprising, in combination, a sealed casing, electrical capacitor elements disposed within the casing, a liquid dielectric comprising chlorinated cyclic hydrocarbons disposed in the casing and immersing the electrical capacitor elements, the casing having an aperture, an electrical bushing connected to the electrical capacitor elements and extending through the aperture to the exterior of the casing, sealing means applied to the bushing at the aperture to seal the aperture, and to position and electrically insulate the bushing from the shoulder on the bushing, a resilient gasket member between the casing and bushing, and retaining means for drawing up the shoulder to the casing and to compress the gasket member to provide a liquid-tight seal, the gasket member comprising a cured dimethyl silicone elastomer.

WILLIAM B. ATKINSON.

REFERENCES CITED

The following references are of record in the file of this patent:

UNITED STATES PATENTS

| Number | Name | Date |
|---|---|---|
| 1,953,216 | Elsey | Apr. 3, 1934 |
| 2,235,566 | Ruben | Mar. 18, 1941 |
| 2,258,218 | Rechow | Oct. 7, 1941 |
| 2,389,802 | McGregor | Nov. 27, 1945 |
| 2,389,804 | McGregor | Nov. 27, 1945 |
| 2,392,713 | Wright | Jan. 8, 1946 |
| 2,407,493 | Hart | Sept. 10, 1946 |

OTHER REFERENCES

Chem. and Eng. News, Vol. 23, No. 18, September 25, 1945, page 1618. Copy in Div. 50.

The Publication "Rubber Age" for November 1944, pages 173 to 175; article entitled "Silicone Rubber—A General Electric Development."